United States Patent [19]

Hasselquist et al.

[11] 4,322,205

[45] Mar. 30, 1982

[54] REGENERATIVE AIR HEATER

[75] Inventors: Paul B. Hasselquist, Maple Grove; Richard Baldner, Minnetonka, both of Minn.

[73] Assignee: The United States of America as represented by the United States Department of Energy, Washington, D.C.

[21] Appl. No.: 210,486

[22] Filed: Nov. 26, 1980

[51] Int. Cl.³ .......................... C21B 9/00; F24H 7/00; F23L 15/02
[52] U.S. Cl. ..................................... 432/214; 165/9.1; 165/9.3; 432/30
[58] Field of Search ................... 165/9.1, 9.2, 9.3, 9.4; 432/30, 214, 216, 217, 218

[56] References Cited

U.S. PATENT DOCUMENTS

| | | | |
|---|---|---|---|
| 3,246,434 | 4/1966 | Ginder | 432/214 |
| 3,439,910 | 4/1969 | Regelin et al. | 432/214 |
| 3,489,401 | 1/1970 | Merdian et al. | 165/9.4 |
| 4,005,982 | 2/1977 | Palz et al. | 432/217 |

*Primary Examiner*—John J. Camby
*Attorney, Agent, or Firm*—Paul A. Gottlieb; Richard G. Besha; James E. Denny

[57] ABSTRACT

A gas-cooled steel skirt is used to support a refractory cored brick matrix and dome structure in a high temperature regenerative air heater useful in magnetohydrodynamic power generation. The steel skirt thermally expands to accommodate the thermal expansion of the dome structure despite substantial temperature differential thereby reducing relative movement between the dome bricks. Gas cooling of the steel skirt allows the structure to operate above its normal temperature during clean-out cycles and also allows for the control of the thermal expansion of the steel skirt.

10 Claims, 3 Drawing Figures

REGENERATIVE AIR HEATER

CONTRACTUAL ORIGIN OF THE INVENTION

The United States Government has rights in this invention pursuant to Contract No. ET-78-C-01-3005 between the U.S. Department of Energy and FluiDyne Engineering Corporation.

BACKGROUND OF THE INVENTION

This invention relates generally to heat regenerators; and specifically to magnetohydrodynamic air heaters operating cyclically at high temperatures and requiring some means for accommodating the resulting thermal expansion and contraction. The invention has particular application in coal-fired, open cycle magnetohydrodynamic power generation.

The function of a regenerative air heater in a direct coal-fired open cycle magnetohydrodynamic power generator is to extract heat directly from the exhaust of the magnetohydrodynamic channel and transfer this heat to the combustion air used to fire the coal combustor, thereby providing sufficient energy input to achieve high combustion temperatures as required for the generator.

The regenerative heater includes an inner chamber which is exposed to high temperature combustion gases which heat a cored brick matrix of refractory material. After the cored brick matrix has been sufficiently heated, the flow of combustion gases through the chamber is stopped, and air intended for combustion is preheated by directing it through the chamber and through the cored brick matrix from which it extracts heat. This heated air is then used to fire the coal combustor.

Designs for the support of the cored brick matrix should allow for efficient bottom flow removal and space utilization. The heater design should also be able to withstand the following adverse conditions:

Repeated sudden thermal shock during each cycle where the on-gas portion of the cycle operates at 2000° F. gas temperatures and the on-air portion of the cycle operates at 1200° F. air temperatures;

Continuous bearing load due to the weight of the matrix which is near the material creep stress limits in the operating temperature range; and Continuous motion of the support system due to thermal expansion and contraction through the cyclic temperature range.

Various types of furnace designs have been proposed which concern problems experienced in the development of structures capable of withstanding high temperatures. Ordinary blast furnaces operate with a high temperature in the range 200°-600° F. and glass furnaces in the range 500°-1500° F. compared to the 2000° to 2300° F. expected with a magnetohydrodynamic regenerative air heater.

SUMMARY OF THE INVENTION

It is an object of this invention to provide a structure for use as a regenerative air heater for extracting heat directly from the exhaust of a combustion channel and capable of transferring this heat to pre-heat the combustion air used to fire a coal combustor providing sufficient energy input to achieve high combustion temperatures as required for a magnetohydrodynamic generator.

It is a further object of the invention to provide an air heater assembly that is capable of incorporating a high temperature bed support capable of sustaining continuous exposure to a number of adverse conditions for extended periods of time, including: cyclic exposure to gas containing potassium sulfate; repeated sudden thermal shock during each cycle where the on-gas portion of the cycle operates at 2000° F. gas temperatures and the on-air portion of the cycle operates at 1200° F. air temperatures; continuous bearing load due to the weight of the matrix which is near the material creep stress limits in the operating temperature range; and continuous motion of the support system due to the thermal expansion and contraction caused by the cyclic temperature variation.

Another object of the invention is to provide an air heater that is capable of exceeding normal operating temperatures during a clean-out cycle which would remove any deposits accumulated in the matrix during the long operating sequence or which resulted from malfunctioning of the heater system.

Another object of the invention is to provide a high temperature air heater that will allow efficient bottom flow removal and space utilization.

Briefly, the invention includes a refractory dome which supports the matrix and which itself is supported by a steel skirt within the heater vessel wall. By careful design, one can match the thermal expansion of the refractory dome to the skirt thus eliminating much of the relative motion between the dome bricks despite repeated thermal shock and the continuous motion of the support system. The support skirt may be gas-cooled to allow the dome to exceed normal operating temperatures during a clean-out cycle. The dome structure provides a bottom chamber which allows efficient bottom flow removal and is efficient in space utilization. The steel skirt can be air-cooled allowing the heater to exceed its normal operating temperatures for clean-out.

Other features and advantages of the present invention will be appreciated by those skilled in the art from the following detailed description accompanied by the attached drawings.

DESCRIPTION OF THE PREFERRED EMBODIMENT

The invention will be described in detail as a magnetohydrodynamic regenerative air heater used to pre-heat air that will be fed into a combustor unit.

Figure 1:
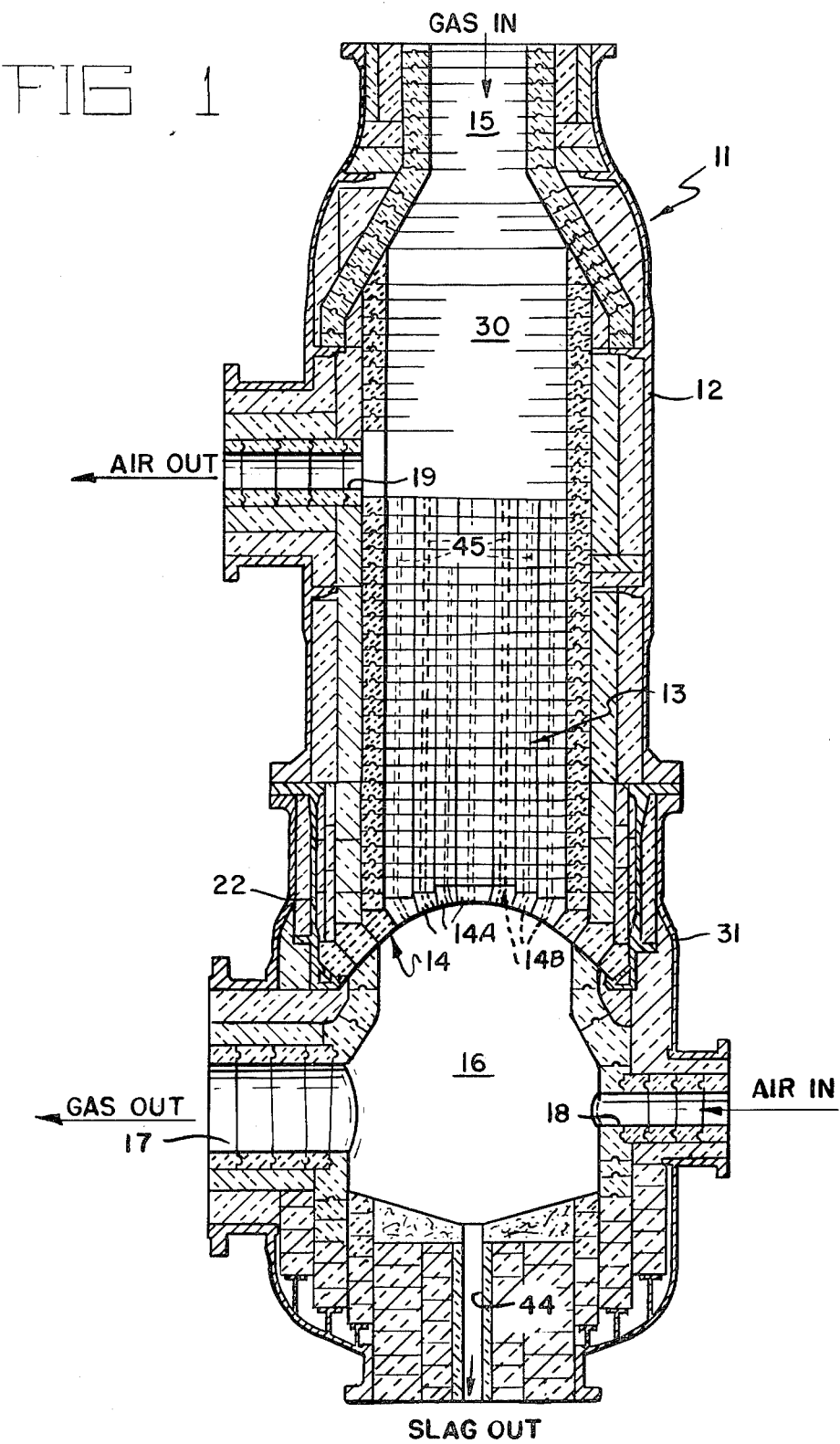
FIG. 1 is a vertical cross-sectional view of a heater incorporating the present invention.

Referring first to FIG. 1, a magnetohydrodynamic regenerative air heater is generally designated by reference numeral 11. It includes three main sections: a vessel shell assembly 12, a cored brick matrix 13 and a base or support dome 14 for supporting the matrix.

Hot exhaust gas from a combustion chamber enters the heater vessel through an opening 15 in an upper chamber 30 near the top of the heater. The combustion gas flows down through the vessel and through the cored brick matrix 13. The combustion gas then continues its flow through the support dome 14 and into a bottom chamber 16 before discharging through an opening 17. The bricks of matrix 13 each include cores or holes formed their entire length. The bricks are aligned such that the holes form flues 45 down the length of the matrix 13 to permit the flow of combustion gases. The bricks absorb the heat of the combustion gases as the gases pass through the core's matrix. At the end of the combustion cycle, the gas input 15 and output 17 channels are closed. Air is forced into the heater vessel through an opening 18 in the bottom chamber 16, up through the support dome 14 and through the cored brick matrix 13 extracting the heat from the matrix as it travels upwards into the upper chamber 30 which has an air outlet opening 19. The heated air then exits from the air output opening 19 where it is used to fire a coal combustor, providing sufficient energy input to achieve high combustion temperatures as required for a magnetohydrodynamic generator.

After the heating cycle is complete, the air openings are closed and the hot exhaust cycle is repeated. The ordinary operating temperatures for the on-gas cycle is 1200° F. air temperature. Slag and molten seed are removed from the heater through an opening 44 at the bottom of the lower chamber.

Figure 2:
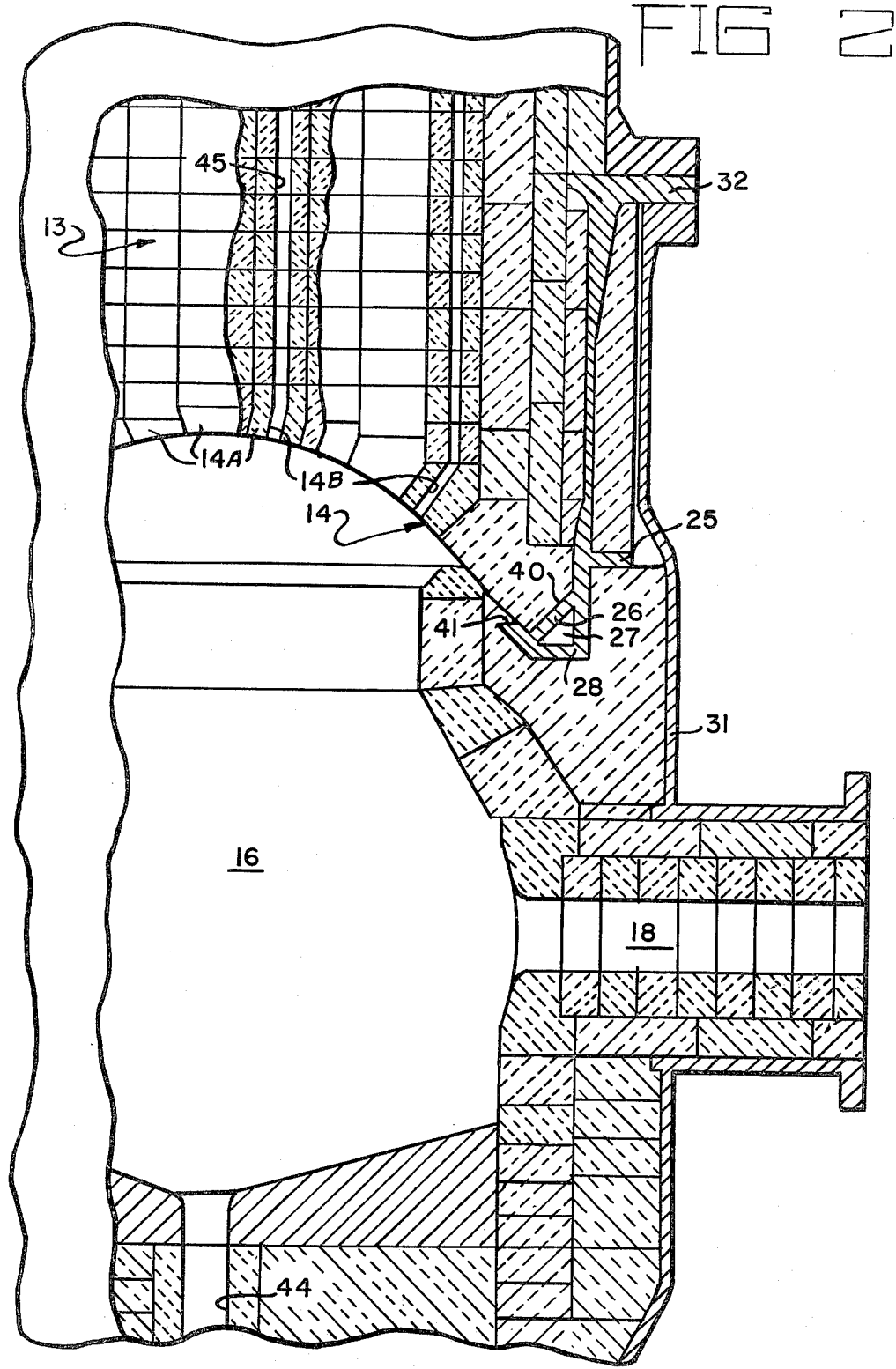
FIG. 2 is an enlarged vertical cross-sectional view of a portion of the bottom of a heater with a dome supported matrix incorporating the present invention.

Referring now to FIG. 2, the cored brick matrix is supported on a dome 14 of refractory material in the shape of bricks, one of which is designated 14A. Holes, such as the one designated 14B in brick 14A, are formed in these bricks, and these holes are aligned with the cores of the overlying matrix. The dome bricks are tapered in the transverse direction, the top surface being larger than the under surface, to prevent the dome bricks from falling through and to redirect the vertical load toward the walls of the vessel. The periphery of the dome abuts the cylindrical side wall 22 of the support skirt to which the load is transmitted. This load includes the weight of the matrix on top of the dome. In many heaters, dome bricks are supported directly off the vessel wall 31. During operation, as the dome bricks become heated, they expand at a faster rate than the vessel wall 31 of the heater, which is cooler. The expansion of the dome bricks in a confined vessel causes relative motion between the dome bricks and can result in hinging and buckling within the dome, a potential source of dome failure.

According to the present invention, the refractory dome 14 which supports the matrix 13 is itself supported and laterally contained by a generally cylindrical steel skirt 22 incorporated in the heater vessel wall 31. The use of the steel skirt which undergoes equivalent thermal expansion at lower temperatures than the refractory bricks allows the apparatus to accommodate more than three-fourths of the thermal expansion of the refractory dome thus eliminating much of the relative motion between the dome bricks and the steel skirt while maintaining the structural integrity of the heater. Stress levels and mechanical creep are thereby reduced to an acceptable level within the support dome. The use of a dome to support the matrix allows for the creation of a bottom chamber which facilitates bottom flow removal yet is efficient in space utilization.

Figure 3:
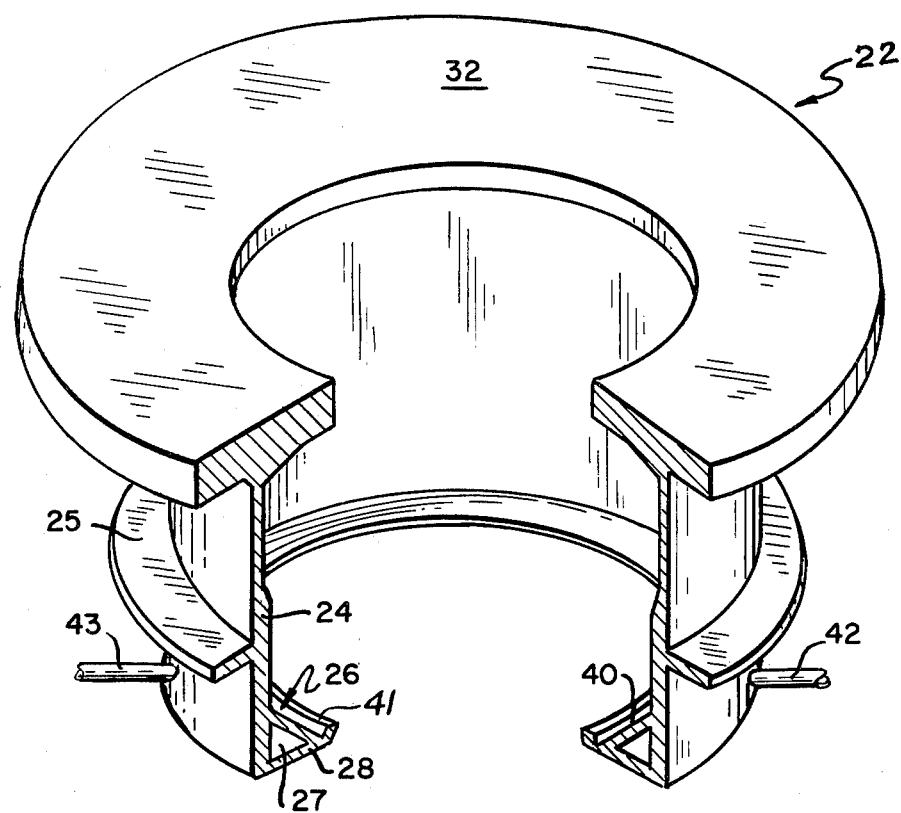
FIG. 3 is a sectional elevation view showing the steel support skirt.

Referring now to FIGS. 2 and 3, the steel skirt 22 includes a cylindrical vertical wall 24 of stainless steel composition designed to accommodate approximately three-fourths of the ceramic brick thermal expansion. A horizontal support flange 32 is attached to the top of the cylindrical wall 24. The flange 32 extends both inside and outside the wall. A second support rib 25 encircling and extending outward from the cylindrical main wall 24 provides additional support for insulation between the skirt 22 and the vessel wall 31 and also provides hoop strength to the structure.

A support ring 26 extends inwardly from the bottom of the cylindrical main body 24 and has a triangular cross-sectional shape, including an inclined bearing wall 40 which extends from the cylindrical main body downwardly and inwardly forming the upper surface of the ring. A retaining lip 41 extends inwardly from the support ring 26. The periphery of the dome abuts the bearing wall 40 and is retained by the lip 41. The dome redirects the vertical load towards the bearings wall 40 and is given support by the hoop strength of the support ring 26.

The ring 26 includes a closed cooling passage 27 of corresponding triangular cross-sectional shape and partially defined by the bearing wall 40. The cooling passage 27 is connected to a gas input tube 42 and a gas discharge tube 43 positioned diametrically opposite of each other. Gas or air can be forced through the ring by means of these tubes in order to cool the ring when necessary. Gas cooling of the support skirt allows the heater to exceed normal operating temperatures during a clean-out cycle which would remove any deposits accumulated in the matrix during a long operating sequence or which resulted from improper operation of the heater system. The cooling airflow rate pressure and temperature are functions of the heater size and thermal operating requirements. Typical cooling requirements for heaters with matrixes up to approximately 15 feet in diameter are listed below:

Range of cooling air flow rates—1,000 to 4,000 PPH
Range of cooling air inlet pressure—10 to 20 PSIG
Range of cooling air inlet—temperature 70° to 600° F.

Controlled cooling may be used to limit the maximum temperature of the support skirt and to regulate the amount of thermal expansion of the steel skirt.

The cylindrical main body 24, flange 32, support rib 25, support rib 26, and retaining lip 41 of the steel skirt 22 are positioned near the bottom and within the walls 31 of the containment vessel such that the retaining lip 41 and inclined bearing wall 40 provide a structural support member for the retention of the brick dome at the bottom of the matrix. The walls of the steel skirt 22, the flange 32, support rib 25, and support rib 26 are positioned above inlets and outlets for receiving and removing gases and waste thereby creating a bottom chamber for efficient flow and space utilization.

The length of the support skirt 22 is sufficient to allow for a gradual temperature gradient between the hot area of the inclined bearing wall 40 and the relatively cool area of the pressure vessel wall 31. The low gradient of temperature reduces thermal stresses in the support skirt 22 and the vessel wall 31.

The embodiments of the invention in which an exclusive property or privilege is claimed are defined as follows:

1. In a regenerative air heater assembly, including a containment vessel within which is a vertically positioned cored-brick matrix, a cylindrical ceramic brick liner, one or more cylindrical ceramic brick liner, one or more cylindrical insulating brick rings, a refractory brick support dome beneath said matrix for supporting the same and partially defining a lower chamber beneath the brick dome provided with inlet and outlet passages for alternating direct combustion air and combustion gases through said matrix for preheating said combustion air and for removing waste, and a matrix support means for said matrix, said liner and said brick rings, the improvement in said support means comprising:

- a generally cylindrical upright main wall of stainless steel composition and of a cylindrical length sufficient to provide a gradual temperature gradient between said matrix support means and the containment vessel wall;
- support ring means integral with and extending inwardly from the bottom of said cylindrical wall and including an inclined bearing wall facing upwardly and inwardly of said main wall;
- a retaining lip extending inwardly from said support ring;
- said main wall, support ring and retaining lip being positioned within the walls of said containment vessel near the bottom of the vessel such that said lip and said bearing wall provide structural support for the retention of said refractory brick dome by virtue of the hoop strength of the support ring, cylindrical main wall and retaining lip, and said cylindrical main wall, flange, and ring cooperate in the support of said matrix, said liner, and said brick rings whereby said matrix support means equalizes thermal expansion and contraction between said support ring means, said matrix and said support dome.

2. The apparatus of claim 1 further comprising a support flange integral with the top of the cylindrical main wall whereby said flange positioned within the walls of said containment vessel cooperates in the support of said matrix, said liner, and said brick rings.

3. The apparatus of claim 1 further comprising a support rib located between the top of said cylindrical main wall and said support ring, said support rib extending outwardly from the cylindrical main body and positioned within the walls of said containment vessel where said support rib cooperates in the support of that part of said assembly vertically positioned outside and above said upright main wall.

4. The apparatus of claim 1 wherein said support ring defines a closed passage about the base of said main wall adapted to receive coolant whereby coolant flowing through passage limits the maximum temperature of said support ring and may be used to regulate the thermal expansion of said support ring.

5. The apparatus of claim 4 wherein said closed passage adapted to receive coolant has openings for receiving and removing said coolant positioned diametrically opposite each other thereby providing an even flow of coolant within the passage and a more uniform cooling of said support ring.

6. The apparatus of claim 1 further comprising a support flange integral with the top of the cylindrical main wall and wherein said support ring further defines a closed passage about the base of said main wall adapted to receive coolant whereby said support flange cooperates in the support of that part of said assembly vertically positioned outside and above said upright main wall and thermal expansion of the support ring is determined by the flow of coolant through said closed cooling passage.

7. The apparatus of claim 1 further comprising a support flange integral with the top of the cylindrical main wall and a support rib located between said support flange and support ring and support rib extending outward from the cylindrical main wall whereby said flange and support rib cooperate in support of said matrix, said liner, and said brick rings.

8. The apparatus of claim 4 further comprising a support rib located between the top of said cylindrical main wall and said support ring, said support rib extending outwardly from said cylindrical main body and positioned within the walls of said containment vessel where said support rib cooperates in the support of that part of said assembly vertically positioned outside and above said upright main wall.

9. The apparatus of claim 4 further comprising a support flange integral with the top of the cylindrical main wall and a support rib located between the support flange and said support ring said support rib extending outwardly from said cylindrical main body, wherein said support flange and support rib positioned within the walls of said containment vessel cooperate in the support of said matrix, said liner, and said brick rings.

10. The apparatus of claim 5 further comprising a support flange integral with the top of the cylindrical main wall, and a support rib located between the support flange and said support ring said support rib extending outwardly from said cylindrical main body wherein said support flange and support rib positioned within the walls of said containment vessel and cooperate in the support of said matrix, said liner, and said brick rings.

* * * * *